Sept. 8, 1931.  J. FLECK  1,822,519
ARTICLE COVER
Filed Nov. 30, 1929
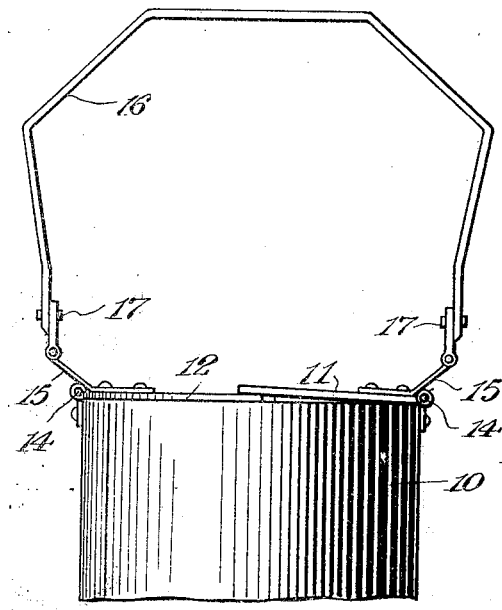
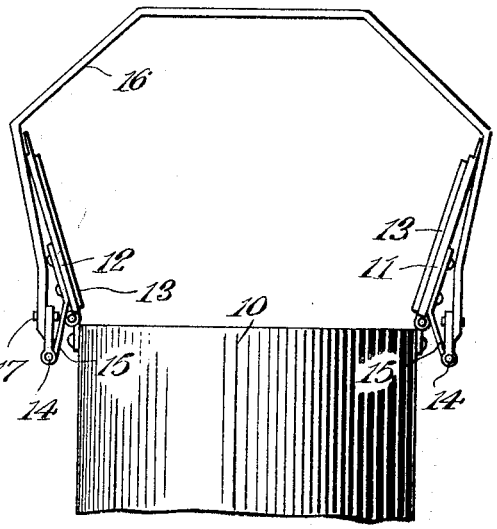
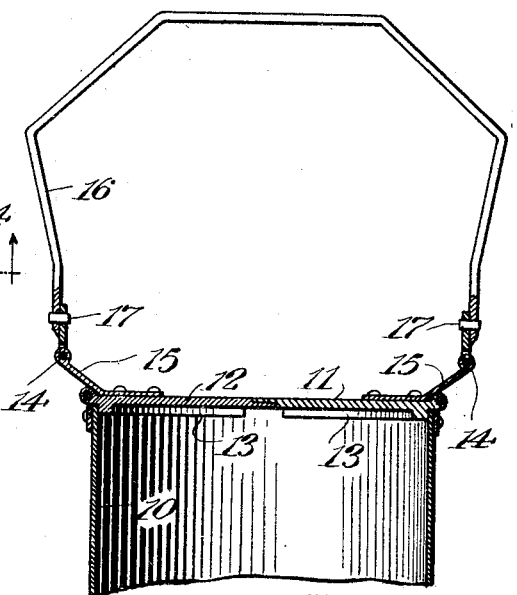
INVENTOR
Joseph Fleck
BY
Howard W. Dix
ATTORNEY Patented Sept. 8, 1931

1,822,519

UNITED STATES PATENT OFFICE

JOSEPH FLECK, OF LONG BRANCH, NEW JERSEY

ARTICLE COVER

Application filed November 30, 1929. Serial No. 410,824.

This invention relates to new and useful improvements in covers for receptacles and operating means therefor.

An object of the invention is to provide a simple, composite, strong, durable, and efficient construction of cover and operating means therefor which are readily adapted for use with a wide variety of receptacles. Such receptacles include candy jars, food warmers, pots, sugar bowls, flour and food cans, barrels, tubs, dishes, trays, clothes hampers, soup tureens, garbage cans, water pails, milk cans, waste and trash receptacles, and the like.

A further object is to provide a simple combination of handle and cover so that whenever the handle is lifted to lift the receptacle, the cover is automatically closed.

Further and more specific objects, features, and advantages will more clearly appear from the detailed description given below when taken in connection with the accompanying drawings which form part of the specification and which illustrate one preferred present form of the invention.

Broadly speaking, the invention includes a handle attached to the cover of a receptacle but connected thereto on the opposite side of the hinge on which the cover is pivoted. The invention further includes a cover pivoted so that when it is fully open, the mass distribution of the cover is so related to the pivot line of the hinge that the cover will stay open. Furthermore, the invention so concerns the connection of the handle to the cover that with the cover open, it is immediately closed when the handle is grasped and lifted to raise the receptacle.

The preferred present form of the invention is shown in the drawings, of which,

Fig. 1 is a side elevation of a receptacle with the handle and cover attached and showing the cover closed;

Fig. 2 is a similar view showing the cover opened;

Fig. 3 is a plan view of a cover; and

Fig. 4 is a section through the cover.

The invention is adapted to be attached to any suitable receptacle such as a can 10. In the form shown the cover comprises two portions 11 and 12 preferably semi-circular in shape and provided with dependent flanges 13 curved to fit just within the upper edge wall of the receptacle.

The cover portions 11 and 12 may meet and overlap in the manner shown in Fig. 1 which is preferred but they may also be constructed to overlap in the manner shown in Fig. 4 as well. The cover members however meet at points opposite their meeting points and are there connected to hinge members 14 which are in turn fastened to the outside of the receptacle near the top thereof.

The hinge members 14 of the cover members 11 and 12 may be provided with outwardly extending portions such as arms 15 which generally extend outward from the cover across the hinge and to a point on the side of the pivot line opposite the cover. To the outer ends of these arms 15 are connected the ends of a handle member such as 16, which may be of any desirable shape or configuration. The hinge members and the cover members are so shaped and constructed that when the cover members are in their fully open position the major portion of the mass of the covers will lie on the outside of the pivot line as seen in Fig. 1 and therefore remain open. Thus, upon pushing down the handle, the covers will be raised to a point just beyond their pivot points when the weight of the covers will throw them to their full open positions. It will also be seen that when the handle element 16 is lifted then the upward pull on the outer ends of the arms 15 will turn the cover members down and close them automatically. It will also be observed that when the cover members are fully open the arms 15 will prevent the members from opening any further and will keep them in this predetermined position. Considering Fig. 2 it will be observed that the handle member acts as a bar or barrier to prevent further outward movement of the cover members. Furthermore, it will be seen that the handle member 18 is also provided with extra pivots 17 to permit it to swing downward below the top of the receptacle when the cover members are in closed position if desired.

While the invention has been described in detail and with respect to a present preferred form thereof, it is not to be limited to such details and forms since many changes and modifications may be made and the invention embodied in other forms and modifications without departing from the spirit and scope of the invention in its broadest aspects. Hence it is desired to cover any and all forms and modifications of the invention coming within the language and scope of any one or more of the appended claims.

What is claimed, is,

1. In combination, a receptacle, a pair of cover members pivoted to the opposite top edges of the receptacle and having adjacent edges when closed, portions of said covers extending beyond and outside the pivot line, a U-shaped handle having its free ends respectively and pivotally connected to the extensions of the covers whereby the downward movement of the handle will open the cover members and an upward movement of the handle will close the cover members, the mass distribution of the cover members being such that when fully opened they remain open until the handle is lifted.

2. In combination, a receptacle, a pair of cover members pivoted to the opposite top edges of the receptacle and having adjacent edges when closed, portions of said covers extending beyond and outside the pivot line, a U-shaped handle having its free ends respectively and pivotally connected to the extensions of the covers whereby the downward movement of the handle will open the cover members and an upward movement of the handle will close the cover members, the mass distribution of the cover members being such that when fully opened they remain open until the handle is lifted, the handle itself acting as a bar to further outward movement of the covers when they are in their opened position.

3. In combination, a receptacle, a pair of cover members pivoted to the opposite top edges of the receptacle and having adjacent edges when closed, portions of said covers extending beyond and outside the pivot line, a U-shaped handle having its free ends respectively and pivotally connected to the extensions of the covers whereby the downward movement of the handle will open the cover members and an upward movement of the handle will close the cover members, the mass distribution of the cover members being such that when fully opened they remain open until the handle is lifted, the handle itself acting as a bar to further outward movement of the covers when they are in their opened position, said handle portion also having a pivoted portion movable around the horizontal axis to dispose the handle substantially below the top of the cover when desired.

This specification signed this 23d day of November, 1929.

JOSEPH FLECK.